United States Patent
Burkhard et al.

(10) Patent No.: US 7,851,713 B2
(45) Date of Patent: Dec. 14, 2010

(54) ADJUSTABLE PARALLEL-GUIDING MECHANISM, SPECIFICALLY FOR A GRAVIMETRIC MEASURING INSTRUMENT

(75) Inventors: Hans-Rudolf Burkhard, Wila (CH); Dominique Genoud, Olten (CH); Andreas Metzger, Männedorf (CH); Stephan Baltisberger, Gossau (CH); Thomas Köppel, Oetwil am See (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 12/611,516

(22) Filed: Nov. 3, 2009

(65) Prior Publication Data
US 2010/0044118 A1    Feb. 25, 2010

Related U.S. Application Data

(63) Continuation of application No. PCT/EP2008/053081, filed on Mar. 14, 2008.

(30) Foreign Application Priority Data

Jun. 1, 2007    (EP)    ................................... 07109474
Jun. 1, 2007    (EP)    ................................... 07109475

(51) Int. Cl.
G01G 3/12    (2006.01)
G01G 21/24    (2006.01)

(52) U.S. Cl. .............................. 177/210 EM; 177/212; 177/229

(58) Field of Classification Search .......... 177/210 EM, 177/212, 229
See application file for complete search history.

(56) References Cited

U.S. PATENT DOCUMENTS

| 4,485,881 | A | * | 12/1984 | Tramposch et al. ......... 177/211 |
| 4,606,421 | A |   | 8/1986  | Schroeder |
| 4,653,600 | A |   | 3/1987  | Melcher et al. |
| 4,679,642 | A | * | 7/1987  | Brock et al. ................. 177/164 |
| 4,798,251 | A |   | 1/1989  | Maaz et al. |
| 4,909,338 | A | * | 3/1990  | Vitunic et al. .................. 177/50 |
| 5,205,369 | A | * | 4/1993  | Neeleman .................... 177/229 |
| 5,250,762 | A | * | 10/1993 | Gustafsson et al. ......... 177/244 |
| 5,866,854 | A | * | 2/1999  | Emery et al. .................... 177/50 |
| 6,232,567 | B1 |  | 5/2001  | Bonino et al. |
| 6,326,562 | B1 |  | 12/2001 | Burkhard et al. |
| 6,378,379 | B1 | * | 4/2002  | Emery et al. ................... 73/856 |
| 6,787,714 | B2 | * | 9/2004  | Iiduka ......................... 177/212 |
| 7,220,924 | B2 | * | 5/2007  | Burkhard ..................... 177/229 |
| 7,429,705 | B2 |  | 9/2008  | Genoud et al. |
| 2003/0042052 | A1 | * | 3/2003 | Iiduka ......................... 177/229 |
| 2005/0098360 | A1 | * | 5/2005 | Burkhard ............. 177/210 EM |
| 2005/0121237 | A1 | * | 6/2005 | Kusumoto ................... 177/229 |

FOREIGN PATENT DOCUMENTS

JP    2002-365125 A    12/2002
WO    2005/031286 A1    4/2005

* cited by examiner

*Primary Examiner*—Randy W Gibson
(74) *Attorney, Agent, or Firm*—Standley Law Group LLP

(57) ABSTRACT

A parallel-guiding mechanism has a vertically movable parallel leg that carries a weighing pan. The movable parallel leg is connected by two essentially horizontal parallel guides to a stationary parallel leg installed in a balance, wherein elastic flexure pivots are formed at the ends of the parallel guides. Incisions that reduce the material strength of the parallel leg in at least one appropriate location define at least one adjustment domain, thus forming a deformation zone which is plastically deformed through application of an adjustment force. In this manner, a corner load error of the parallel-guiding mechanism is corrected.

16 Claims, 5 Drawing Sheets

ADJUSTABLE PARALLEL-GUIDING MECHANISM, SPECIFICALLY FOR A GRAVIMETRIC MEASURING INSTRUMENT

CROSS-REFERENCE TO RELATED APPLICATIONS

This application is a continuation under 35 USC §120 of PCT/EP2008/053081, filed 14 Mar. 2008, which is in turn entitled to benefit of a right of priority under 35 USC §119 from European patent applications 07 10 9474.2 and 07 10 9475.9, both of which were filed 1 Jun. 2007. The content of each of the applications is incorporated by reference as if fully recited herein.

TECHNICAL FIELD

The disclosed embodiments relate to a parallel-guiding mechanism, specifically for a gravimetric measuring instrument, wherein the mechanism has a stationary and a movable parallel leg as well as an upper and a lower parallel guide. A weighing pan which is supported and vertically guided by the movable parallel leg receives the weighing load which exerts a force on the weighing pan, wherein the force is transmitted either directly to a measurement transducer or by way of a force-reducing lever mechanism. The parallel-guiding mechanism, the force-transmitting system and the measurement transducer constitute in essence the weighing cell of a gravimetric measuring instrument. The known state of the art includes a variety of functional principles of weighing cells such as for example weighing cells with strain gauges, weighing cells with oscillating strings, or weighing cells based on electromagnetic force compensation (EMFC).

BACKGROUND OF THE ART

In EMFC weighing cells, the weight of the load is transmitted either directly or by way of one or more force-transmission levers to an electromechanical measurement transducer which delivers a signal corresponding to the weighing load. The signal is further processed by an electronic portion of the weighing instrument and the result is presented on a display.

Weighing cells with a strain transducer contain a deformable body which is provided with strain gauges. Placing the load on the weighing cell causes an elastic deformation of the deformable body. In many cases, the deformable body is configured as a parallelogram-shaped measuring element, specifically as a parallel-guiding mechanism with specially designed bending zones, whereby defined zones of deformation are created where the strain gauges are arranged. As a result of the load placed on the movable parallel leg, the strain gauges are subjected to tension or compression which causes a change of their electrical resistance in comparison to the load-free state of the movable parallel leg, wherein the change in resistance represents a measure for the applied load.

In string-oscillator weighing cells the mechanical design structure is largely analogous to EMFC- and strain gauge weighing cells, except that an oscillating-string transducer is used in place of an electromagnetic measurement transducer. As a result of the load, the tension in an oscillating string is increased, and the frequency change, in turn, represents a measure for the applied load.

The weighing cells of the foregoing description share an essential trait which is common to all gravimetric measuring instruments with parallel-guided weighing pans, namely that the weight force transmitted from the weighing pan to the measurement transducer in general depends to a small degree on whether the weighing load is placed on the center of the weighing pan or is shifted out of the center towards the periphery of the weighing pan. This can have the undesirable consequence that a balance indicates different amounts of weight for one and the same weighing load, depending on where the weighing load was placed on the weighing pan. These deviations which are caused by an eccentric placement of the weighing load on the weighing pan are commonly referred to as corner load errors.

In a parallelogram-shaped measuring element or a parallel-guiding mechanism which constrains the weighing pan carrier to a parallel movement by means of two parallel, essentially horizontal parallel guides, corner load errors are caused primarily by the fact that the parallel guides deviate slightly from an ideal, absolutely parallel alignment. The relative magnitude of the corner load error, i.e. the ratio between the error of the weight and the amount of the test weight being used corresponds approximately to the relative geometric deviation by which the error is caused. A distinction is made between a corner load error in the lengthwise direction and a corner load error in the transverse direction of the parallel-guiding mechanism, in accordance with the direction in which the test weight is shifted on the weighing pan in the corner load test of the balance. A corner load error in the lengthwise direction occurs when the vertical distance of the parallel guides at the end where they are connected to the stationary parallel leg is not exactly the same as at the opposite end where they are connected to the movable parallel leg. A corner load error in the transverse direction on the other hand occurs when the two parallel guides are twisted relative to each other, i.e. a condition where the distance between the parallel guides varies across the width of the parallel guides.

In the existing state of the art, for example, in EP 0 990 880 A2, in JP 2002 365125 A, and in WO 2005/031286, parallel-guiding mechanisms of weighing cells are disclosed which include a device for the adjustment of the corner load error. This adjustment mechanism follows a concept where the stationary parallel leg has at least one bending zone which is located between the fixation areas of the parallel guides and configured so as to define a tilt axis perpendicular to the lengthwise direction of the parallel-guiding mechanism. By tilting the fixation areas relative to each other by means of an adjustment screw, the end of the upper parallel guide that is connected to the stationary parallel leg can be raised as well as lowered. This allows the corner load error in the lengthwise direction to be corrected. Depending on the design of the adjustment mechanism, the pivot axis or the fixation area can be adjusted in its transverse tilt, whereby the corner load errors in the transverse direction of the weighing cell can be adjusted. In order to correct the corner load errors, i.e. to align the parallel guides so that they are parallel to each other, the fixation areas need to be tilted relative to each other only by a minute amount. Thus, the bending zones are subjected only to elastic deformation. This is important also for the reason that the bending zones are not overstressed under operating loads and therefore not subjected to plastic deformation. A plastic deformation of the bending zone would lead to a permanent out-of-parallel setting of the parallel guides and would have a detrimental effect on the weighing signal. Furthermore, the bending stress resulting from the elastic deformation and thus the restoring force of the bending zone is often used to clamp and thereby secure the adjustment screw.

All of the adjustment devices of the known state of the art with adjustment screws thus have in common that the adjusted position is maintained by means of the adjustment screws, and that the material in the bending zone is therefore in a permanent state of stress. It is therefore possible that over the long term an age-related stress could occur in this kind of corner load adjustment device due to relaxation of the material domains that are elastically stress-biased in one or the other direction. Reversible short-term changes can be caused by temperature fluctuation if the stationary parallel leg and the adjustment screws have different coefficients of thermal expansion.

As a countermeasure against the problem just described, a further adjustment possibility which does not require adjustment screws has been disclosed in a state-of-the-art reference. For example in weighing cells in which the weighing pan is guided by a monolithically configured parallel-guiding mechanism, as disclosed in commonly-owned U.S. Pat. No. 6,232,567 B1 to Bonino, the parallelism deviations of the parallel guides and, consequently, the corner load errors associated with them can be corrected by removing material from the bending zones of the parallel guides by grinding or filing. A removal of material from the topside causes the effective center of rotation of the flexure pivot to be offset in the downward direction, while a removal of material from the underside of the bending zone will offset its effective center of rotation in the upward direction.

The adjustment of corner load errors by removing material from the flexure pivots presents a problem in weighing cells which are designed for precision balances and analytical balances, i.e. for small weighing loads and high resolutions, and which therefore have slender flexure pivots. The grinding or filing to move material from a thin flexure pivot requires a sensitive touch. This operation is therefore in most cases performed manually and is accordingly cost-intensive.

In view of these unsatisfactory aspects of the corner load adjustment in parallel-guiding mechanisms of the currently known state-of-the-art, it is an object to provide a means of adjustment for the corner load errors in a parallel-guiding mechanism which avoids the aforementioned drawbacks and which can be realized in a simple manner at a favorable cost.

SUMMARY

This task is solved by a parallel-guiding mechanism with adjustable means for setting the parallelism of the guides, and also by a method whereby the corner load accuracy of the parallel-guiding mechanism can be adjusted, as described in the appended claims. Advantageous further developed embodiments of the parallel-guiding mechanism are also described in the claims.

A parallel-guiding mechanism with a movable parallel leg that is connected to a stationary parallel leg by two parallel guides and thereby constrained in guided vertical movement, wherein elastic flexure pivots or elastic parallel guide sections are formed or arranged in the areas of connection between the parallel guides and the parallel legs, includes at least one adjustment domain formed by at least one incision at the stationary parallel leg and/or at the movable parallel leg, wherein the zone of deformation that forms the adjustment domain can be plastically deformed in a controlled manner through application of an adjustment force or an adjustment torque. As a result of the plastic deformation of the at least one deformation zone, a controlled permanent change is produced in the position of the parallel guides in relation to each other, whereby a corner load error of the parallel-guiding mechanism is corrected. Also due to the plastic deformation, the at least one zone of deformation is stress-free in the adjusted state, at least when there is no load applied to the movable parallel leg.

A load-free state of the movable parallel leg means that the mass of the movable parallel leg itself is included in the load balance, so that the parallel-guiding mechanism is not subjected to tensile forces, compressive forces or bending moments which could of course also propagate into the zone of deformation. A stress-free state means that after an adjustment, since the latter is accomplished by plastic deformation, the zone of deformation is free of material stresses.

The inventive concept according to the foregoing description wherein an adjustment domain in a parallel-guiding mechanism can be adjusted by plastic deformation meets the objective stated above. Comprehensive experiments have shown that following the plastic deformation of the zone of deformation there is an instant relaxation of the material stresses that are present in the deformed material domain and that the latter therefore has a strong, permanent stability in keeping its shape.

The fast relaxation of stresses within the material also has a very positive influence on the operating behavior of the parallel-guiding mechanism. The presence of internal material stresses acting on the elastic flexure pivots of the parallel-guiding mechanism could have a negative influence on the elastic behavior of the flexures and thus affect the weighing result. Due to the fast relaxation of the internal stresses, the adjustment is therefore also not subject to aging over a long time period. Since no adjustment screws are being used, there are also no problems caused by a difference between the respective coefficients of thermal expansion of the mechanism body and of the screws.

Of course, after the parallel-guiding mechanism has been adjusted, i.e. after the zone of deformation has been changed and the material stresses in the zone of deformation have relaxed, the zone of deformation can be secured by a means of fixation. Thus, the parallel-guiding mechanism can be exposed to very strong forces without the risk that an elastic deformation or even an additional plastic deformation of the zone of deformation could occur during operation of the parallel-guiding mechanism. Accordingly, this embodiment is likewise distinguished in critical aspects from the known state-of-the art solutions, where elastic stresses in the at least one deformation zone are maintained by the adjustment screws.

In the context of the present description, expressions such as "above", "below", "horizontal", "vertical" and the like always refer to the orientation of the parallel-guiding mechanism in its normal state of operation, in other words to the direction of gravity. Furthermore, the larger of the vertical surface areas of the parallel-faced block are referred to as lateral surfaces, the sectional plane that is equidistant from the two lateral surfaces is referred to as vertical lengthwise median plane, the upper and lower horizontal surfaces are referred to as topside and bottom side, the narrow vertical surface at the movable parallel leg is referred to as the front end surface, and the narrow vertical surface at the stationary parallel leg is referred to as the rear end surface.

Even though the zone of deformation is formed by incisions, this does not imply that the zone of deformation necessarily has to be shaped monolithically out of the stationary and/or the movable parallel leg. The zone of deformation as well as the parallel legs can also be assembled from a plurality of individual components. However, in order to avoid the problems described above in regard to temperature-related stresses in the parallel-guiding mechanism, the parallel legs are preferably made of one piece in which at least one zone of deformation is created by incisions which are produced by milling, sawing, planing, drilling, turning, cutting, spark erosion or other work methods.

The incisions forming the adjustment domain thus reduce the material strength of the stationary parallel leg and/or the movable parallel leg in at least one appropriate location. An appropriate location is one where the parallel guides can be adjusted relative to each other, for example by arranging the at least one incision between the upper parallel guide and the lower parallel guide.

A parallel leg includes all of the parts that serve to connect respective ends of the upper and lower parallel guides, so that the latter are held in a fixed relationship to each other, i.e. at a fixed distance from each other.

In a first embodiment, the at least one zone of deformation is formed by incisions traversing the material horizontally. By applying a force or a torque, the adjustment domain can be given a tilt about a tilt axis that is defined by the zone of deformation, oriented in the transverse direction of the parallel-guiding mechanism. As a result of the tilting, the end of one of the parallel guides which connects to the adjustment domain receives a permanent offset in the vertical direction, whereby a corner load error in the lengthwise direction of the parallel-guiding mechanism can in essence be corrected.

When a load is applied to the movable parallel leg, the parallel guides are subjected to tensile and compressive forces. The tilt axis of the zone of deformation, also referred to as neutral axis, is therefore preferably located in the same horizontal plane as the flexure pivot that is to be offset in the vertical direction. With this advantageous arrangement, reactive bending moments in the zone of deformation are largely avoided or reduced to an extent where they can be ignored, as the tensile forces pass approximately through the neutral axis. Thus, the accuracy of the corner load adjustment can be kept stable regardless of the load.

In a preferred further developed version of the first embodiment, the adjustment domain is traversed by a further incision at the vertically adjustable end of the parallel guide which connects to the adjustment domain, wherein the further incision extends in the lengthwise vertical median plane of the movable parallel leg or the stationary parallel leg and reaches as far as the elastic flexure pivot. However, the flexure pivot itself is not bisected by the further incision. As a result of the further incision, two separate adjustment domains are formed adjacent to each other with separate zones of deformation, so that:

on the one hand, by applying parallel forces or torques to the two separate, adjacent adjustment domains and thus imparting a parallel tilt adjustment to them, a permanent parallel vertical offset of the elastic flexure pivot can be produced, whereby a corner load error in the lengthwise direction of the parallel-guiding mechanism can be corrected, and on the other hand, by applying anti-parallel forces or torques to the two separate, adjacent adjustment domains and thus imparting opposite tilt adjustments to them, a permanent twist can be given to the movable end of the parallel guide, whereby a corner load error in the transverse direction of the parallel-guiding mechanism can be corrected.

This embodiment is particularly well suited for parallelogram-shaped measuring devices the carry strain gauges in the areas of the elastic flexure pivots.

As a general statement, it can be said that parallel adjustments, i.e. adjustments of equal magnitude and direction, of the two adjustment domains affect primarily the corner load error in the lengthwise direction of the parallel-guiding mechanism, while anti-parallel adjustments, i.e. adjustments of equal magnitude but opposite directional orientation, of the two adjustment domains affect primarily the corner load error in the transverse direction of the parallel-guiding mechanism. However, there can be a certain amount of cross-over between the two directions, so that a parallel adjustment can also affect to a minor extent the corner load error in the transverse direction, and an anti-parallel adjustment can also affect to a minor extent the corner load error in the lengthwise direction.

As a preferred feature in parallel-guiding mechanisms for high-resolution gravimetric measuring instruments, in order to additionally facilitate the twisting of the parallel guide, the elastic flexure pivot at the vertically adjustable end of the parallel guide which connects to the adjustment domain is split by continuing the further incision as far as the parallel guide, so that the elastic flexure pivot is bisected like the adjustment domain. However, the elastic flexure pivot can also be split into two separate elastic flexure pivots by means of a perforation, and the further incision can connect to this perforation.

In a second embodiment of the parallel-guiding mechanism, a first zone of deformation is formed in a first horizontal plane by horizontal incisions so that, by applying a force or a torque, a tilt adjustment of the adjustment domain can be effected relative to a tilt axis that is defined by the first zone of deformation in the transverse direction of the parallel-guiding mechanism. Further, a second zone of deformation which is perpendicular to the orientation of the first zone of deformation is formed in a second horizontal plane by horizontal incisions so that, by applying a force or a torque, a tilt adjustment of the adjustment domain can be effected relative to a tilt axis that is defined by the second zone of deformation in the lengthwise direction of the parallel-guiding mechanism.

Although this is the preferred arrangement, the tilt axes or zones of deformation and the incisions do not necessarily have to lie in a horizontal plane. The planes containing the zones of deformation and incisions could also be inclined at an arbitrarily selected angle, except that the planes may not be oriented parallel to the vertical direction because, logically, with vertical tilt axes the parallel guides could no longer be adjusted relative to each other.

In a third embodiment of the parallel-guiding mechanism, the at least one zone of deformation is formed by a recess cut around the circumference of the stationary and/or the movable parallel leg. The optimal shape for the cross-sectional profile of the zone of deformation can be determined through experiments and depends on the configuration of the parallel-guiding mechanism and the plastic deformation behavior of the material used in the zone of deformation. A possible approach could be based on a circular cross-section.

If a bore hole is arranged in the parallel leg with the zone of deformation, the latter can also have a cross-section in the form of a circular ring. If the bore hole is offset from the area center of gravity of the cross-section, the area moment of inertia relative to the corresponding tilt axes—and thus the bending behavior of the zone of deformation relative to these tilt axes—can be changed.

The at least one adjustment area can be formed in an upper part of the stationary parallel leg and/or of the movable parallel leg, whereby the end of the upper parallel guide that connects to the at least one adjustment domain is made adjustable.

However, the at least one adjustment area can also be formed in a lower part of the stationary parallel leg and/or of the movable parallel leg, whereby the end of the lower parallel guide that connects to the at least one adjustment domain is made adjustable.

It is likewise possible to combine the two concepts, so that the upper parallel guide is adjustable by means of an adjustment domain which is formed on the stationary parallel leg, and the lower parallel guide is adjustable by means of an adjustment domain that is formed on the movable parallel leg, with the respective tilt axes ideally oriented perpendicular to each other.

Furthermore, the parallel-guiding mechanism does not necessarily have to be configured in the shape of a rectangular block. An arrangement is also possible where the stationary parallel leg surrounds the movable parallel leg at least in a horizontal plane. In a special embodiment of this concept, the stationary parallel leg is configured in a tubular shape, and the movable parallel leg is arranged and constrained in linear guided movement inside the tubular-shaped parallel leg. The parallel guides in this kind of a parallel-guiding mechanism are ideally parallel-guiding diaphragm springs in which parallel-guide sections are formed.

The at least one adjustment domain is preferably equipped with at least one gripping location for the engagement of an adjustment tool, preferably a lever, to generate the adjustment force or the adjustment torque.

The at least one gripping location can be configured simply as a bore hole which can be engaged by a pin of an adjustment tool.

The parallel-guiding mechanism and possibly further force-transmitting elements are preferably made of one piece formed out of a block of material.

The parallel-guiding mechanism and the incisions that form the adjustment domain can be produced for example by narrow linear separations which are cut through the material block.

The following variations of the embodiments described above are likewise considered part of the inventive concept, as each of them has at least one adjustment domain with a zone of deformation that is designed for adjustment by plastic deformation.

In principle, one can make the assumption that a horizontal orientation of the tilt axes is in most cases preferable. It is conceivable however, that with tilt axes arranged at an angle to a horizontal plane, the adjustment process could possibly be simplified or that certain types of parallel-guiding mechanisms, for reasons based on their design, may require tilt axes that are set at an angle.

Furthermore, one or more adjustment domains or deformation zones can be formed on each parallel leg. Also, a parallel leg does not necessarily have to be configured as a single unit but can for example be vertically divided into two parts as is often the case in parallel-guiding mechanisms with triangular parallel guides.

To prevent that a further elastic and/or plastic deformation occurs in the zone of deformation after its plastic-deformation adjustment, the at least one zone of deformation can be immobilized and secured with at least one means of fixation.

Following is a description of possible methods of setting the corner load accuracy of a parallel-guiding mechanism with at least one adjustment domain formed by incisions and containing at least one plastically deformable zone of deformation, wherein a controlled permanent change in the position of the parallel guides in relation to each other can be accomplished and adjusted by applying an adjustment force or an adjustment torque, if necessary.

The method to set the corner load accuracy of a parallel-guiding mechanism with two adjustment domains that are separated from each other can have the following process steps:

First, the completely assembled and operational weighing cell is connected to an electronic weighing and indicator unit. As a part of a prescribed adjustment procedure which can also include other settings such as for example the linearity and span calibration, a test weight is placed on the load receiver, for example a flat round weighing pan of about the same diameter as the length of the parallel guides, and shifted in the lengthwise direction of the parallel-guiding mechanism between two diametrically opposite points at the edge of the pan. A reading of the weight displayed on the indicator is taken and recorded for both positions. In a parallel-guiding mechanism that has not yet been adjusted, one will normally find that the weights indicated for the two positions differ from each other by an amount that exceeds the tolerance limit. To even out the difference between the indicated amounts of weight, i.e. to correct the corner load error in the lengthwise direction, the parallelism of the parallel guides needs to be adjusted in the lengthwise direction, for example by engaging an adjustment tool at the two adjustment domains and imparting parallel changes, i.e. plastic deformations of equal magnitude and equal direction, to the aforementioned narrow material domains, wherein the magnitude and the directional orientation of the parallel changes depend, respectively, on the magnitude of the corner load error in the lengthwise direction and on whether the error is positive or negative, and wherein the magnitude and direction of the adjustment are documented in an adjustment procedure which was established on the basis of calculations and/or experiments. After an adjustment has been made, the corner load error in the lengthwise direction is determined again and, if necessary, a readjustment is made in accordance with the foregoing description until the corner load error in the lengthwise direction lies within the prescribed tolerance.

Preferably as a next step of the adjustment method, the test weight is shifted in the transverse direction of the parallel-guiding mechanism between two diametrically opposite points at the edge of the pan and, in an analogous way as above, the corner load error for the transverse direction is determined. To correct the corner load error in the transverse direction, the orientation of the adjustable parallel guide needs to be adjusted in the transverse direction, for example by engaging an adjustment tool at the two adjustment domains and imparting anti-parallel changes, i.e. plastic deformations of equal magnitude but opposite direction, to the aforementioned narrow material domains, whereby one of the flexure pivots that are separated by a perforation is raised and the other is lowered, wherein the magnitude and the directional orientation of the anti-parallel changes depend, respectively, on the magnitude of the corner load error in the transverse direction and on whether the error is positive or negative. After an adjustment has been made, the corner load error in the transverse direction is determined again and, if necessary, a readjustment is made in accordance with the foregoing description until the corner load error in the lengthwise direction lies within the prescribed tolerance.

To verify that the adjustment in the transverse direction has not again caused a corner load error in the lengthwise direction, the error in the lengthwise direction is determined anew. After both corner load errors have been found within tolerance, the process is terminated. Otherwise, a readjustment is made in accordance with the observed errors until the corner load errors are within tolerance for both the lengthwise and the transverse direction.

Under a further possible method for the adjustment of the corner load of a parallel-guiding mechanism with two adjustment domains that are separate from each other, the following procedure can be used:

As in the preceding method, the completely assembled and operational weighing cell is connected to a compatible electronic weighing and indicator unit. The test weight, which corresponds for example to one-half of the weighing capacity of the weighing cell, is placed on the load receiver and shifted in the lengthwise direction of the parallel-guiding mechanism between two diametrically opposite points at the edge of the pan. From the respective readings of the displayed weight, the corner load error in the lengthwise direction is determined. Next, the test weight is shifted in the transverse direction of the parallel-guiding mechanism, and from the associated weight readings, the corner load error for the transverse direction is determined. If the corner load errors are found within tolerance for the lengthwise as well as for the transverse direction, the process is terminated. Otherwise, as a next step, an adjustment is made for the larger of the corner load errors that were found. In other words, if the corner load error in the lengthwise direction is larger than in the transverse direction of the parallel-guiding mechanism, a parallel change is made for the two adjustment domains. If on the other hand the corner load error in the transverse direction is larger than in the lengthwise direction of the parallel-guiding mechanism, an anti-parallel change is made for the two adjustment domains. Next, the corner load errors are again determined in both directions, meaning that the adjustment cycle loops back and is repeated until the corner load errors for the lengthwise direction as well as for the transverse direction are found within tolerance. This adjustment method, wherein always only the larger of the remaining corner load errors is adjusted, takes the cross-over effect between the adjustment for the lengthwise and transverse directions into account, so that due to the convergence of the process the corner load errors disappear after only a few rounds of adjustment.

The following third method is suitable for a computer-assisted and possibly automated corner load adjustment. The shifting of the test weight and/or the setting of the two separate adjustment domains can be performed manually or by means of computer-controlled devices.

In a first step, the existing corner load errors in the lengthwise direction as well as in the transverse direction are determined in a computer which is connected to the electronics of the weighing cell. Based on the outcome of the determination and taking the cross-over effect into account, the amounts and directional orientations of the required adjustment settings are calculated and could also be displayed on an indicator, whereupon the adjustment settings are made either manually or automatically. The process then cycles back to the start, so that possibly remaining corner load errors in the lengthwise and transverse directions can be determined. If the errors are found in tolerance, the process is terminated. Otherwise, a readjustment is performed and the cycle is repeated until the corner load errors are within the prescribed tolerance.

BRIEF DESCRIPTION OF THE DRAWINGS

Details of the parallel-guiding mechanism and of the procedure for the adjustment of the errors are explained hereinafter in more detail with references to the drawings listed in the following overview, wherein identical parts are identified with identical reference numbers and wherein.

DETAILED DESCRIPTION

Figure 1:
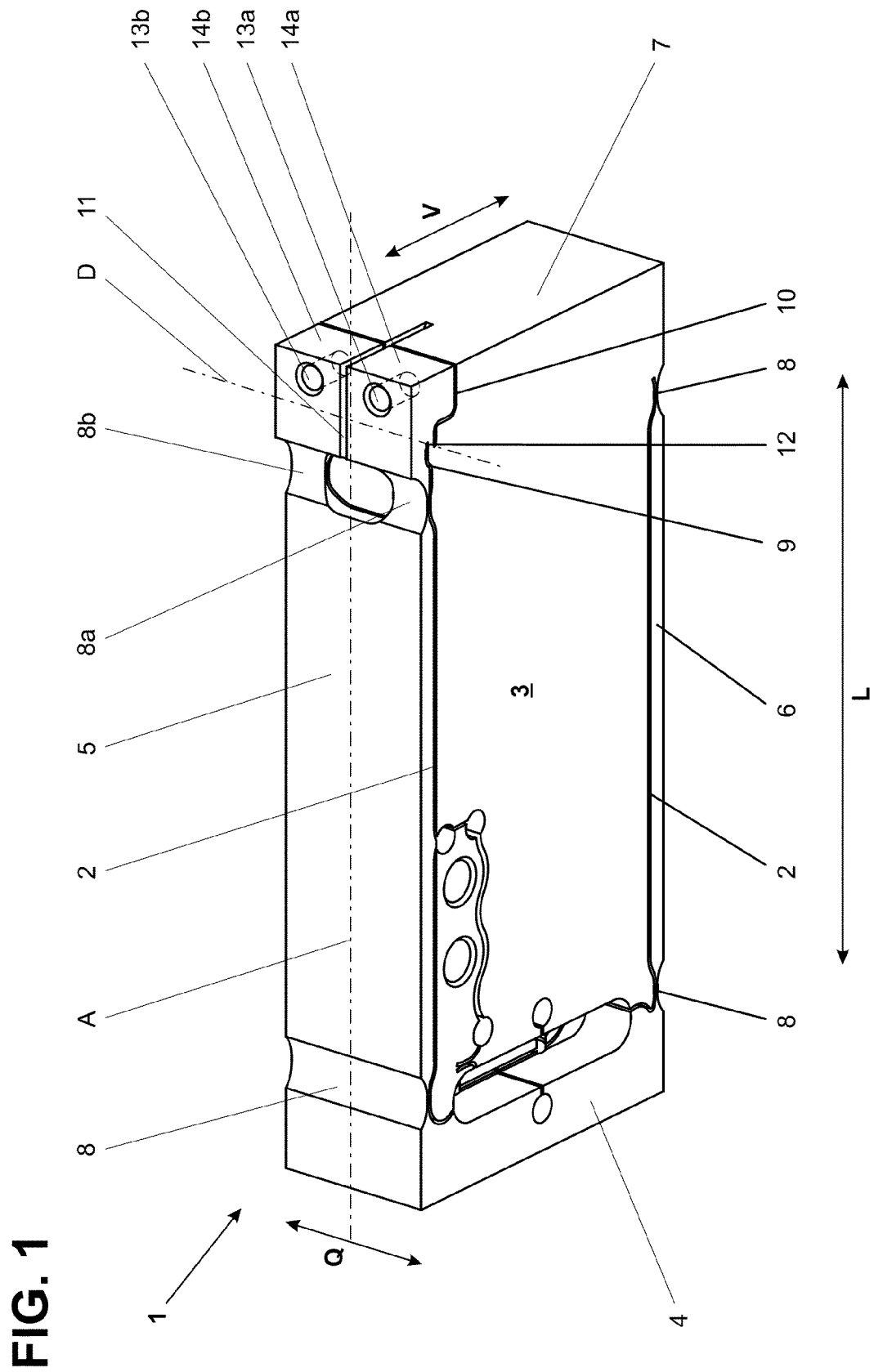
FIG. 1 is a schematically simplified perspective view of a first embodiment of a parallel-guiding mechanism.

FIG. 1 shows a parallel-guiding mechanism 1 which is formed in a monolithic material block 3 through narrow cuts 2 traversing the material block 3 in the direction perpendicular to its lateral surfaces. As a result of the cuts, a movable parallel leg 4 is formed to which a load receiver can be attached. The movable parallel leg 4 is connected by two essentially horizontal parallel guides 5, 6 to a stationary parallel leg 7 which is supported on solid ground. So-called flexure pivots 8, 8a, 8b, i.e. elastically flexible zones of reduced material thickness, are formed at the ends of the parallel guides. In particular, at least one adjustment domain 14a, 14b is formed in the monolithic material block 3 by three further incisions 9, 10, 11. With the at least one adjustment domain 14a, 14b, the end of one of the two parallel guides 5, 6, preferably of the upper parallel guide 5, where the latter is connected to the stationary parallel leg 7, can be adjusted in regard to its vertical distance from the lower parallel guide 6 as well as in regard to its transverse tilt angle relative to the lower parallel guide 6, whereby an out-of-parallel condition that may exist between the parallel guides 5, 6 in the lengthwise direction L as well as in the transverse direction Q of the parallel-guiding mechanism can be corrected by the adjustment. In this embodiment, the further incisions 9 and 10 forming the adjustment domain 14a, 14b are designed to reduce the material thickness at suitable locations of the monolithic material block 3 to a sufficient extent that these zones of deformation 12 can be plastically deformed by applying an adjustment force or an adjustment torque, so that as a result the end of the adjustable parallel guide 5 where the latter connects to the adjustment domain 14a, 14b is permanently offset in the vertical direction V and/or permanently twisted about the longitudinal axis A that passes through the pivots of the parallel guide 5.

Figure 2A:
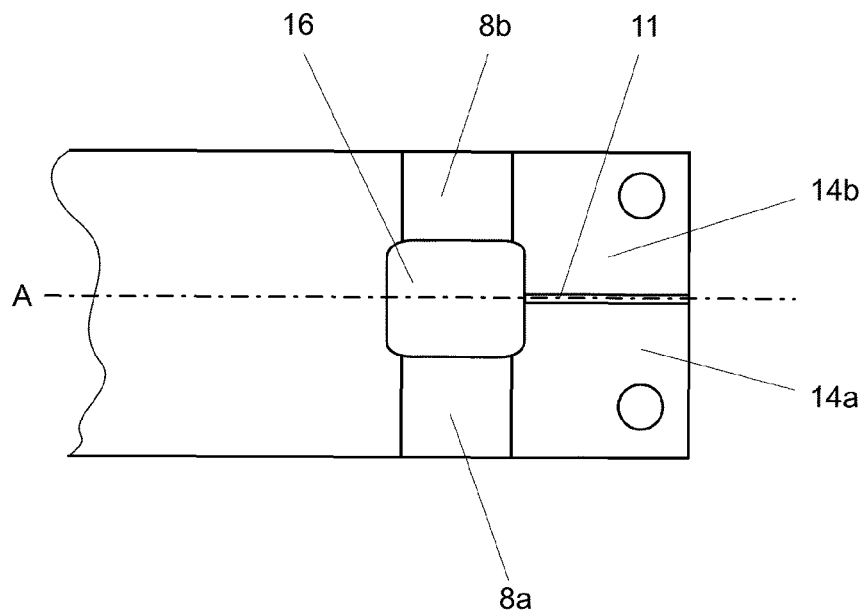
FIG. 2a is a detail view, seen from above, of the adjustment domain of the FIG. 1 parallel-guiding mechanism.

FIG. 2a illustrates in a view from above that the flexure pivot 8 has a perforation 16 at the end that connects to the adjustment domain 14a, 14b and that the adjustment domain is bisected by a vertical incision 11, whereby two separate flexure pivots 8a, 8b are created which are connected, respectively, to the separate adjustment domains 14a and 14b.

Figure 2B:
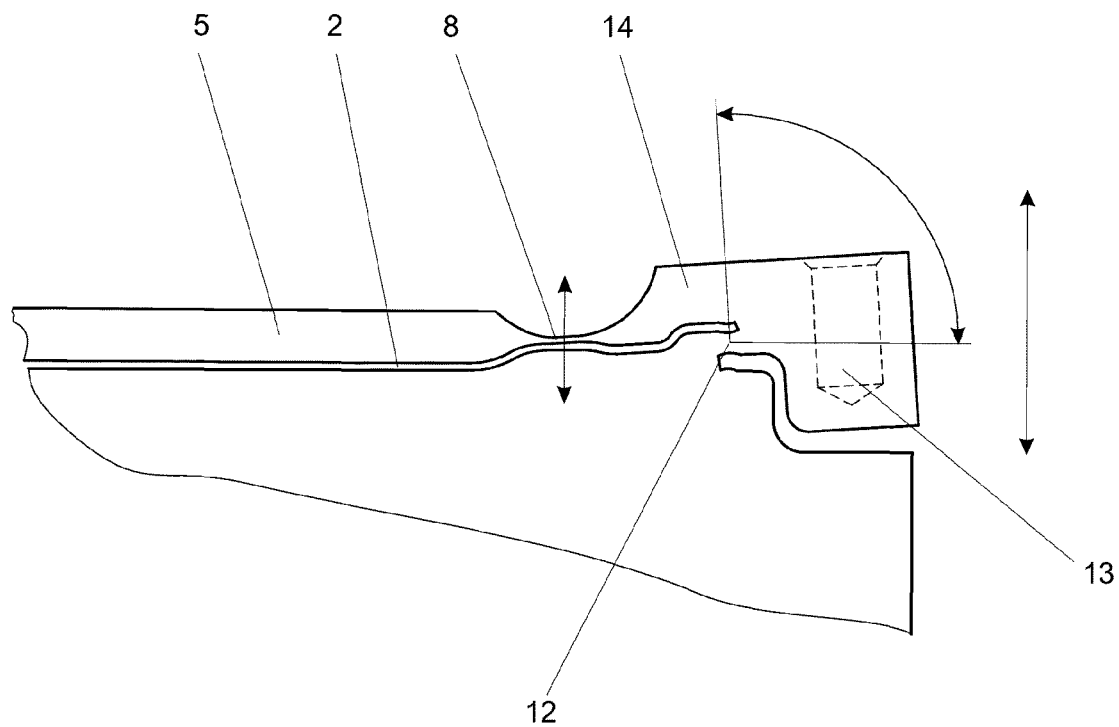
FIG. 2b is a side view of the adjustment domain of the FIG. 1 embodiment, after an adjustment has been made.

FIG. 2b illustrates in a side view how through the application of a torque, for example by engaging a lever in the bore hole 13a, the adjustment domain 14 is forced into a slight tilt about the tilt axis D (see FIG. 1) of the zone of deformation 12. If the tilting is counterclockwise, the elastic flexure pivot 8 in FIG. 2b is being lowered by a small amount.

Figure 3:
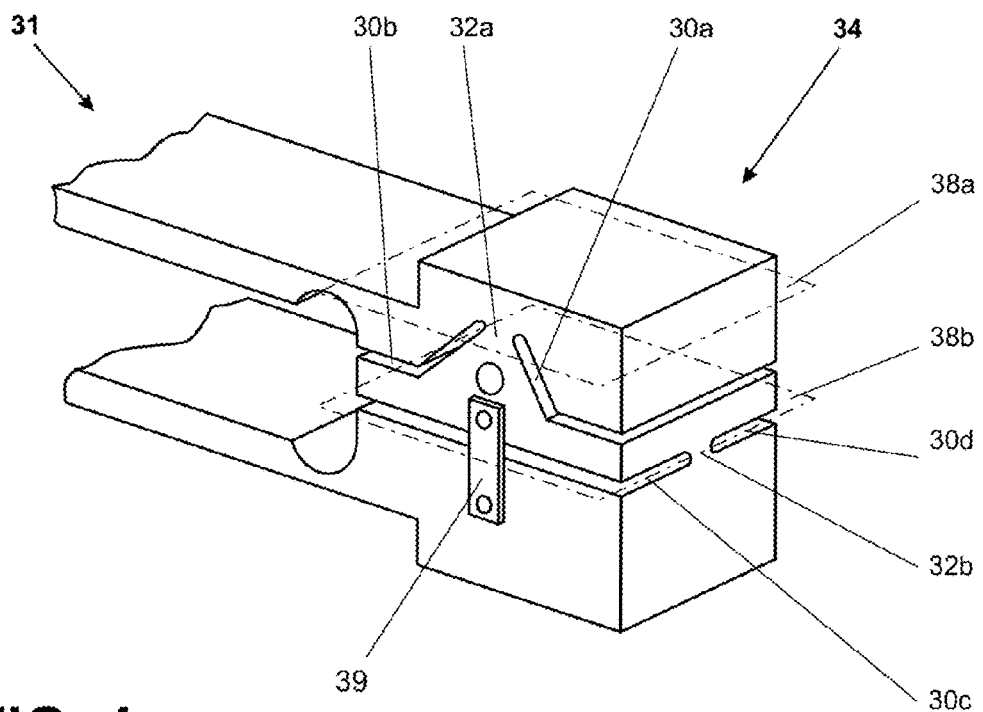
FIG. 3 is a schematically simplified perspective view of a second embodiment of a parallel-guiding mechanism.

FIG. 3 shows a second embodiment of the adjustment domain 34 of a parallel-guiding mechanism 31 in a three-dimensional representation. Because this description refers in essence only to a different design of the adjustment domain 34, only half of the parallel-guiding mechanism 31 is shown in the drawing. In a first horizontal plane 38a, a first deformation zone 32a is formed by incisions 30a and 30b traversing the block horizontally, so that be applying a force or a torque, the adjustment domain 34 can be forced into a tilt about a tilt axis defined by the first zone of deformation 32a in the transverse direction of the parallel-guiding mechanism 31. Further, in a second horizontal plane 38b, a second deformation zone 32b oriented at a right angle to the first deformation zone 32a is formed by incisions 30c and 30d traversing the block horizontally, so that be applying a force or a torque, the adjustment domain 34 can be forced into a tilt about a tilt axis defined by the second zone of deformation 32a in the lengthwise direction of the parallel-guiding mechanism 31.

As illustrated in FIG. 3, after the parallel-guiding mechanism 31 has been adjusted, i.e. after the first zone of deformation 32a and/or the second zone of deformation 32b has been changed, the adjustment can be secured by a means of fixation 39. Thus, the parallel-guiding mechanism 31 can be exposed to very strong forces without risking that an elastic deformation or even an additional plastic deformation of the zone of deformation could occur during operation of the parallel-guiding mechanism 31. Of course each of the zones of deformation in FIGS. 1 to 6 can be secured with at least one means of fixation 39.

Unlike the state-of-the-art designs in which elastic stresses are locked in by the adjustment screws, a parallel-guiding mechanism 31 secured in this manner is nearly free of material stresses in the area of the deformation zones 32a, 32b. The means of fixation 39, shown here as a strap plate, represents only one possible solution to durably secure and fixate the deformation zones 32a, 32b. Of course, there are a multitude of different means of fixation that could be used, for example wedges, screws, bolts, plates and the like. In order to avoid elastic or even plastic deformations that could occur because of different thermal expansions, the means of fixation 39 is made preferably of the same material as the parallel leg that is to be secured.

Figure 4:
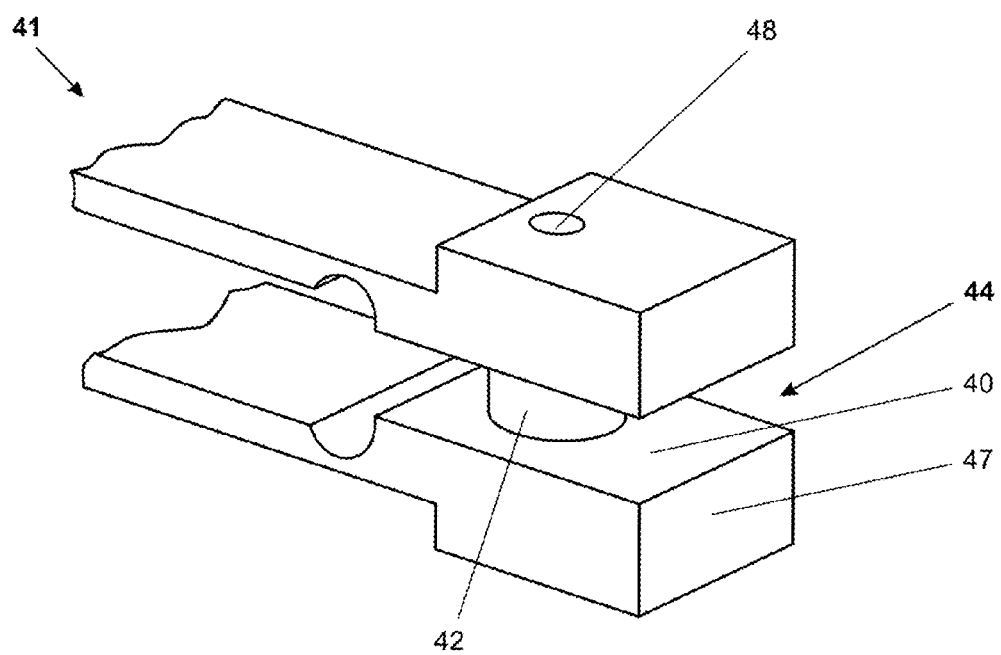
FIG. 4 is a schematically simplified perspective view of a third embodiment of a parallel-guiding mechanism.

FIG. 4 illustrates a third embodiment of the adjustment domain 44 of a parallel-guiding mechanism 41 in a three-dimensional representation. Because this description refers in essence only to a different design of the adjustment domain 44, only half of the parallel-guiding mechanism 41 is shown in the drawing. The at least one zone of deformation 42 is formed on the stationary parallel leg 47 by a groove-shaped recess 40 around the circumference of the stationary parallel leg 47. The optimal shape for the cross-sectional profile of the zone of deformation 42 in a horizontal plane can be determined through experiments and depends on the configuration of the parallel-guiding mechanism 41 and the plastic deformation behavior of the material used in the zone of deformation 42. A possible embodiment could be based on a circular cross-section. As the zone of deformation 42 is of a cylindrical shape as shown schematically in FIG. 4, this embodiment differs from the adjustment domain in FIG. 3 in that the orientation of the tilt axis remains undefined. The orientation of the tilt axis for the adjustment is determined in the adjustment process, based on the measured corner load deviations. Of course, the vertical position for the tilt axis can be defined by means of a constriction in the diameter of the cylindrical zone of deformation 42. If the parallel leg 47 with the zone of deformation 42 includes a bore hole 48, the zone of deformation 42 can also have a cross-section in the form of a circular ring. If the bore hole 48 is offset from the area center of gravity of the cross-section, the area moment of inertia relative to the corresponding tilt axes—and thus the bending behavior of the zone of deformation relative to these tilt axes—can be changed.

Figure 5:
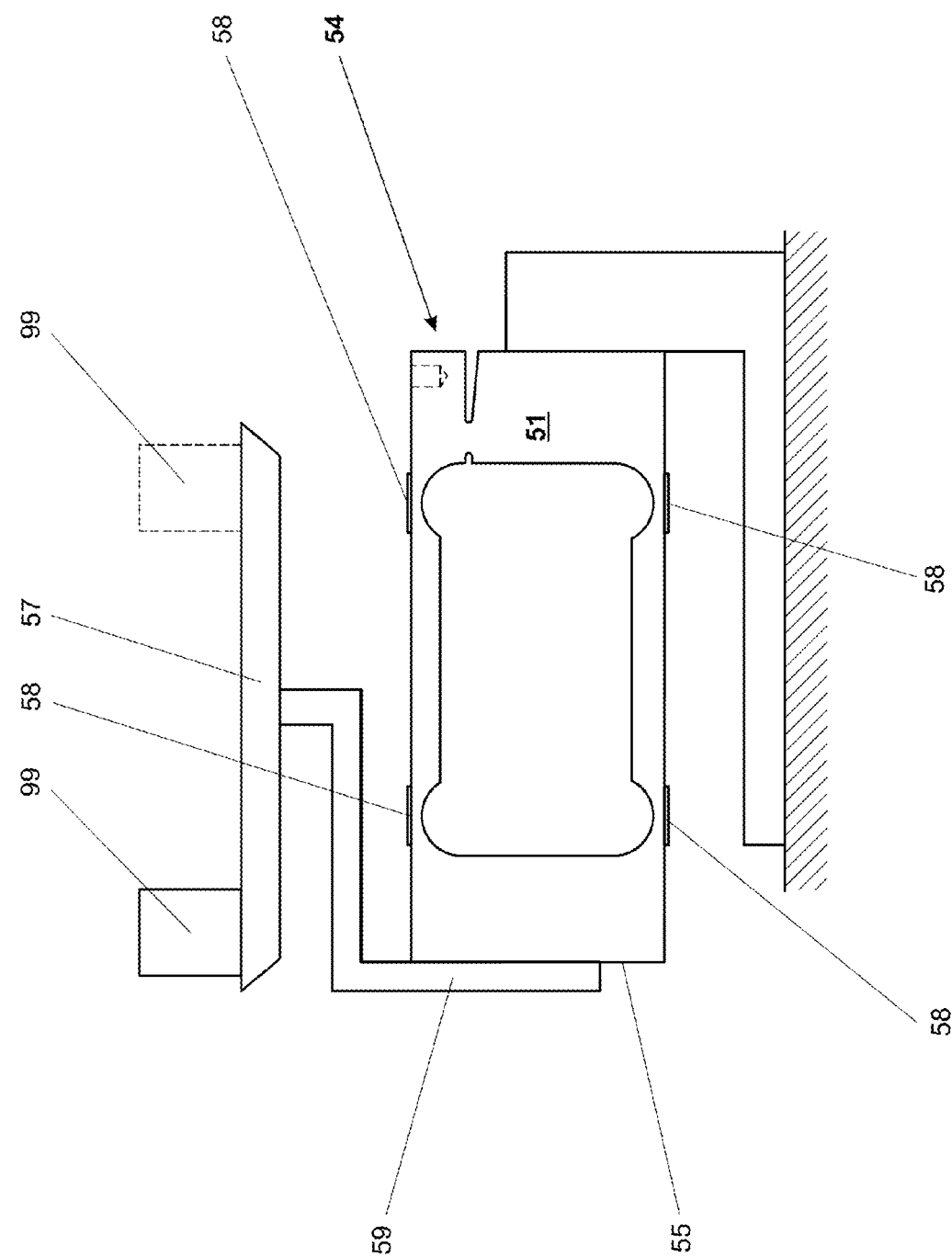
FIG. 5 illustrates the principle of the corner load adjustment for a parallel-guiding mechanism and the use of the latter in a gravimetric measuring instrument.

Finally, FIG. 5 illustrates the concept of corner load errors in a broad outline. A parallel-guiding mechanism 51, shown here schematically as a deformable body with strain gauges 58, carries a weighing pan 57 which is attached to the movable parallel leg 55 by way of a support 59. As previously described in detail in the context of FIGS. 1 to 4, this deformable body 51 likewise includes an adjustment domain 54. A test weight 99, typically corresponding to one-half of the weighing capacity of the weighing cell, is for example weighed first in the position on the left and then in the position on the right (the latter being indicated by a broken outline). The difference between the indicated weighing results for the two positions is referred to as corner load error in the lengthwise direction of the parallel-guiding mechanism 51. The corner load error in the transverse direction is determined in an analogous weighing test in the direction that is orthogonal to the plane of the drawing, wherein the two positions of the test weight 99 are located, respectively, in front of the drawing plane and behind it on the diameter of the weighing pan 57.

Of course, the parallel-guiding mechanism does not necessarily have to be configured in the shape of a rectangular block.

Figure 6:
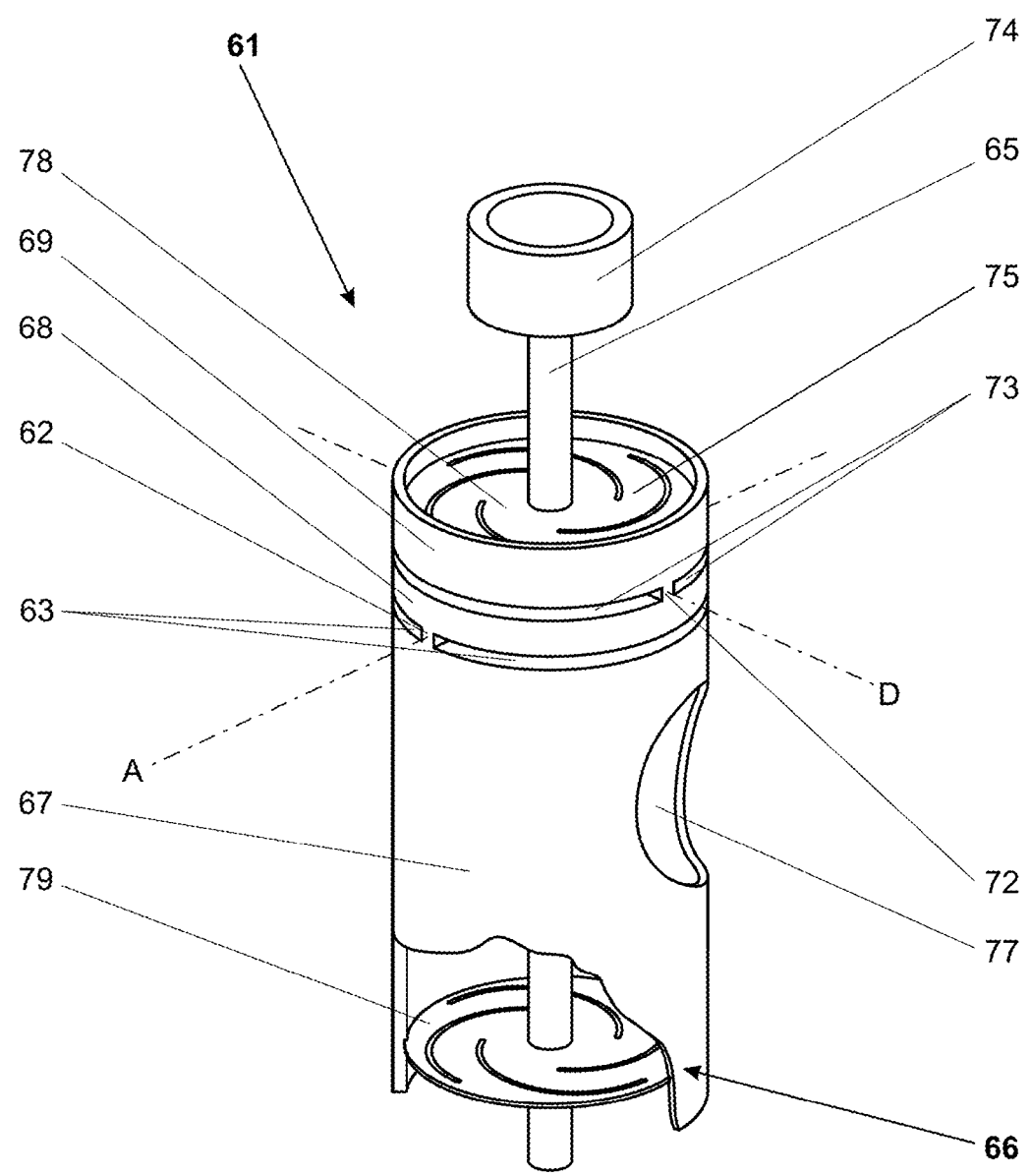
FIG. 6 is a schematically simplified perspective view of an embodiment of a parallel-guiding mechanism, wherein the stationary parallel leg surrounds the movable parallel leg.

FIG. 6 represents a three-dimensional view of a gravimetric measuring instrument with a parallel-guiding mechanism 61. As is apparent from FIG. 6, the stationary parallel leg 67 surrounds the movable parallel leg 65. The entire parallel-guiding mechanism is configured rotationally symmetric. The upper end of the stationary parallel leg 67 has first horizontal incisions 73 slitting the stationary parallel leg 67 close to half-way and leaving only two diametrically opposed material bridges in place (only one of which is visible in FIG. 6) as deformation zones 72. In a plane below the first horizontal incisions 73, the second horizontal incisions 63 and the diametrically opposed deformation zones 62 (only one of which is visible in FIG. 6) are arranged with an angular offset of 90°. An opening 77 in the stationary parallel leg 67 allows access to the enclosed space inside the stationary parallel leg 67, for example to a force-measuring cell arranged there (not shown in FIG. 6). The zones of deformation 62 and 72 and the ring-shaped part 68 between them form a kind of gimbaled support of a ring-shaped end portion 69 of the stationary parallel leg 67. The ring-shaped end portion 69 forms the border frame of an upper parallel guide 78 which is configured as a diaphragm spring. The lower parallel guide 79 is mounted in an analogous arrangement inside the lower end portion 66 of the stationary parallel leg 67. The vertically movable parallel leg 65 which is arranged in the center of the stationary parallel leg 67 is connected to the two parallel guides 78 and 79. The parallel guides 78 and 79 include elastic parallel guide sections 75 which guide the vertically movable parallel leg 65 within a limited range of vertical movement. In addition, the vertically movable parallel leg 65 forms the force-transmitting member between a weighing pan 74 and the force-measuring cell which is located inside the stationary parallel leg 67.

Except for the fact that the tilt axes defined by the deformation zones 62, 72 lie in different horizontal planes, there is no difference between this arrangement and the previously described embodiments in a geometrical sense as well as from a mechanical point of view in regard to their adjustment behavior. A corner load error is corrected by tilting the ring-shaped end portion 69. The tilting which entails the plastic deformation of the deformation zones is effected with the help of a means of adjustment, for example a screwdriver. Its tip is inserted in one of the slits 63, 73, and the slit is forced apart far enough to cause a plastic deformation of the deformation zones 62, 72. Between the algebraic amount (magnitude and sign) of a corner load error component and the tilting required for the correction, i.e. the magnitude and direction of the tilt angle, there is a specific and reproducible correlation which is determined through empirical experiments and/or analytical calculations during the development of the weighing module.

For example in the parallel-guiding mechanism 61 shown in FIG. 6, if the shifting of a test weight in the direction of the shift axis A from left to right produces a negative corner load error (which means that the weight reading for the right-hand position of the weight is smaller than for the left-hand position), this can be corrected by a permanent counterclockwise displacement of the ring-shaped end portion 69 about the tilt axis D.

What is claimed is:

1. A parallel-guiding mechanism comprising:
   a movable parallel leg;
   a stationary parallel leg;
   two parallel guides, connecting the respective parallel legs and constraining the movable parallel leg in guided vertical movement;
   elastic flexure pivots or elastic parallel guide sections, formed or arranged in the areas of connection between the parallel guides and the parallel legs;
   at least one adjustment domain, formed by at least one incision provided at least one of the respective parallel legs; and
   at least one deformation zone, delimited by the at least one incision, each deformation zone being plastically deformable in a controlled manner by applying an adjustment force or torque which causes a controlled permanent change in the position of the parallel guides relative to each other, the controlled permanent change serving to correct a corner load error of the parallel-guiding mechanism, such that each deformation zone is stress-free at least when no load is applied to the movable parallel leg.

2. The parallel-guiding mechanism of claim 1, wherein:
   incisions that traverse one of the parallel legs horizontally form the at least one deformation zone, which defines a tilt axis in the transverse direction of the parallel-guiding mechanism; and
   the end of one of the parallel guides that connects to the adjustment domain is permanently offset in the vertical direction by a force or torque that tilts the adjustment domain about the tilt axis, thereby correcting a corner load error in the lengthwise direction of the parallel-guiding mechanism.

3. The parallel-guiding mechanism of claim 2, wherein:
   the tilt axis is arranged on the same horizontal plane as the elastic flexure pivot which is to be offset in the vertical direction.

4. The parallel-guiding mechanism of claim 1, comprising:
   a further incision traversing the adjustment domain at the vertically adjustable end of the parallel guide that connects to the adjustment domain, the further incision extending in the lengthwise vertical median plane of one of the parallel legs and reaching as far as the elastic flexure pivot, the further incision forming two separate adjustment domains, adjacent to each other, with separate deformation zones, such that:
   a corner load error in the lengthwise direction of the parallel-guiding mechanism is corrected by applying parallel forces or torques to impart a parallel tilt adjustment to the two separate, adjacent adjustment domains, producing a permanent parallel vertical offset of the elastic flexure pivot, and
   a corner load error in the transverse direction of the parallel-guiding mechanism is corrected by applying anti-parallel forces or torques to impart opposite tilt adjustments to the two separate, adjacent adjustment domains, producing a permanent twist to the movable end of the parallel guide.

5. The parallel-guiding mechanism of claim 1, wherein:
   horizontal incisions form a first deformation zone in a first horizontal plane; and
   horizontal incisions form a second deformation zone in a second horizontal plane, the second deformation zone oriented perpendicular to the first deformation zone, such that:
   a tilt adjustment of the adjustment domain relative to a tilt axis defined by the first deformation zone in the transverse direction of the parallel-guiding mechanism is effected by applying a force or a torque; and
   a tilt adjustment of the adjustment domain relative to a tilt axis defined by the second deformation zone in the lengthwise direction of the parallel-guiding mechanism is effected by applying a force or a torque.

6. The parallel-guiding mechanism of claim 1, wherein:
   the stationary parallel leg surrounds the movable parallel leg at least in a horizontal plane.

7. The parallel-guiding mechanism of claim 6, wherein:
   a recess, formed around the circumference of one of the parallel legs, provides the deformation zone associated with the parallel leg.

8. The parallel-guiding mechanism of claim 1, further comprising:
   at least one gripping location associated with the at least one adjustment domain for engaging an adjustment tool that generates the adjustment force or torque.

9. The parallel-guiding mechanism of claim 1, wherein:
   the parallel-guiding mechanism is monolithically formed from a block of material.

10. The parallel-guiding mechanism of claim 1, further comprising:
    a means for immobilizing and securing the at least one deformation zone.

11. The parallel-guiding mechanism of claim 1, wherein:
    a recess, formed around the circumference of one of the parallel legs, provides the deformation zone associated with the parallel leg.

12. A gravimetric measuring instrument, comprising:
    a parallel-guiding mechanism of claim 1.

13. A method of adjusting a parallel-guiding mechanism to correct a corner load error, comprising the steps of:
    providing a parallel-guiding mechanism of claim 1; and
    applying, as necessary, an adjustment force or torque to plastically deform the deformation zone to achieve a controlled permanent change in the relative position of the parallel guides, the deformation zone being free of stress when no load is applied to the movable parallel leg.

14. The method of claim 13, further comprising the steps of:
    if necessary, connecting operationally the provided parallel-guiding mechanism to a load receiver and a force-measuring cell, with the force-measuring cell connected to a compatible electronic signal-processing and indicator unit;
    correcting, if necessary, a corner load error in the lengthwise direction of the parallel-guiding mechanism to within a prescribed tolerance by:
    shifting a test weight between a first and a second position on a horizontal plate of the load receiver connected to the parallel-guiding mechanism, the respective positions lying diametrically opposite each other in the lengthwise direction;
    taking readings of the test weight in the first and second positions; and determining, as an algebraic difference between the two weight readings, the corner load error for the lengthwise direction;

comparing the determined corner load error to the prescribed tolerance; and if the corner load error exceeds the prescribed tolerance, applying parallel corrections to the two separate adjustment domains, with the correction depending in regard to the magnitude and direction of the determined corner load error, and repeating the substeps for correcting the corner load error in the lengthwise direction until the corner load error is within the prescribed tolerance; and correcting, if necessary, a corner load error in the transverse direction of the parallel-guiding mechanism to within a prescribed tolerance by:

shifting a test weight between a first and a second position on a horizontal plate of the load receiver connected to the parallel-guiding mechanism, the respective positions lying diametrically opposite each other in the transverse direction;

taking readings of the test weight in the first and second positions; and determining, as an algebraic difference between the two weight readings, the corner load error for the transverse direction;

comparing the determined corner load error to the prescribed tolerance;

if the corner load error exceeds the prescribed tolerance, applying corrections of equal magnitude but opposite direction to the two separate adjustment domains, with the correction depending in regard to the magnitude and direction of the determined corner load error, and repeating the substeps for correcting the corner load error in the transverse direction until the corner load error is within the prescribed tolerance; and if a correction in the transverse direction was performed, verifying that the correction has not again caused a corner load error in the lengthwise direction by repeating the correcting substeps for the lengthwise direction until the corner load error is each direction is within prescribed tolerance.

15. The method of claim 13, further comprising the steps of:

if necessary, connecting operationally the provided parallel-guiding mechanism to a load receiver and a force-measuring cell, with the force-measuring cell connected to a compatible electronic signal-processing and indicator unit;

shifting a test weight between a first and a second position on a horizontal plate of the load receiver connected to the parallel-guiding mechanism, the respective positions lying diametrically opposite each other in the lengthwise direction, taking readings of the test weight in the first and second positions; and determining, as an algebraic difference between the two weight readings, the corner load error for the lengthwise direction;

shifting a test weight between a first and a second position on a horizontal plate of the load receiver connected to the parallel-guiding mechanism, the respective positions lying diametrically opposite each other in the transverse direction, taking readings of the test weight in the first and second positions; and determining, as an algebraic difference between the two weight readings, the corner load error for the transverse direction;

comparing each of the determined corner load errors to a prescribed tolerance for the corner load error in the respective direction, and, if the prescribed tolerance is exceeded by the determined corner load error in either direction:

selecting the determined corner load error having the larger absolute value;

if the determined corner load error in the lengthwise direction has the larger absolute value, applying parallel corrections to the two separate adjustment domains, with the correction depending in regard to the magnitude and direction of the determined corner load error;

if the determined corner load error in the transverse direction has the larger absolute value, applying corrections of equal magnitude but opposite direction to the two separate adjustment domains, with the correction depending in regard to the magnitude and direction of the determined corner load error; and repeating the process from the first of the two steps of shifting the test weights, until the determined corner load errors in each direction are within the respective prescribed tolerances.

16. The method of claim 13, further comprising the steps of:

if necessary, connecting operationally the provided parallel-guiding mechanism to a load receiver and a force-measuring cell, with the force-measuring cell connected to a compatible electronic signal-processing and indicator unit;

shifting a test weight between a first and a second position on a horizontal plate of the load receiver connected to the parallel-guiding mechanism, the respective positions lying diametrically opposite each other in the lengthwise direction, taking readings of the test weight in the first and second positions; and determining, as an algebraic difference between the two weight readings, the corner load error for the lengthwise direction;

shifting a test weight between a first and a second position on a horizontal plate of the load receiver connected to the parallel-guiding mechanism, the respective positions lying diametrically opposite each other in the transverse direction, taking readings of the test weight in the first and second positions; and determining, as an algebraic difference between the two weight readings, the corner load error for the transverse direction;

comparing each of the determined corner load errors to a prescribed tolerance for the corner load error in the respective direction, and, if the prescribed tolerance is exceeded by the determined corner load error in either direction:

calculating the amount of adjustment to bring the determined corner load errors within the respective prescribed tolerances, the mutual influences of the adjustments being taken into account in the calculation;

displaying the calculated adjustment on the indicator;

applying the calculated adjustment in the lengthwise direction, if any, by applying parallel corrections to the two separate adjustment domains;

applying the calculated adjustment in the transverse direction, if any, by applying corrections of equal magnitude but opposite direction to the two separate adjustment domains; and repeating the process from the first of the two steps of shifting the test weights, until the determined corner load errors in each direction are within the respective prescribed tolerances.

* * * * *

UNITED STATES PATENT AND TRADEMARK OFFICE
CERTIFICATE OF CORRECTION

PATENT NO.        : 7,851,713 B2
APPLICATION NO.   : 12/611516
DATED             : December 14, 2010
INVENTOR(S)       : Burkhard et al.

It is certified that error appears in the above-identified patent and that said Letters Patent is hereby corrected as shown below:

In column 13, line 20, please delete "provided at least" and insert -- provided at at least --.

Signed and Sealed this
Twenty-second Day of February, 2011

David J. Kappos
*Director of the United States Patent and Trademark Office*